(12) United States Patent
Achkinazi et al.

(10) Patent No.: US 12,430,029 B2
(45) Date of Patent: Sep. 30, 2025

(54) STORAGE SYSTEM WITH DYNAMIC FAIR QUEUE SCHEDULING OF HOST AND REPLICATION INPUT-OUTPUT OPERATIONS

(71) Applicant: Dell Products L.P., Round Rock, TX (US)

(72) Inventors: Igor Achkinazi, Northborough, MA (US); Lev Knopov, Brookline, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/530,649

(22) Filed: Dec. 6, 2023

(65) Prior Publication Data

US 2025/0190110 A1    Jun. 12, 2025

(51) Int. Cl.
    *G06F 3/06* (2006.01)
(52) U.S. Cl.
    CPC .............. *G06F 3/061* (2013.01); *G06F 3/065* (2013.01); *G06F 3/0679* (2013.01)
(58) Field of Classification Search
    CPC ......... G06F 3/061; G06F 3/065; G06F 3/0679
    See application file for complete search history.

(56) References Cited

U.S. PATENT DOCUMENTS

| | | | |
|---|---|---|---|
| 10,310,760 B1 | 6/2019 | Dreier et al. | |
| 10,893,105 B1 | 1/2021 | Bono et al. | |
| 11,550,511 B2 | 1/2023 | Mallick et al. | |
| 2003/0056038 A1* | 3/2003 | Cochran | G06F 3/0613 710/36 |
| 2003/0149773 A1 | 8/2003 | Harbin et al. | |
| 2009/0154472 A1 | 6/2009 | Chung et al. | |
| 2013/0198312 A1 | 8/2013 | Tamir et al. | |
| 2013/0226887 A1 | 8/2013 | Braam et al. | |
| 2015/0012607 A1 | 1/2015 | Cayton et al. | |

(Continued)

OTHER PUBLICATIONS

Storpool Storage, "Demystifying: What is NVMeOF?" https://storpool.com/blog/demystifying-what-is-nvmeof, Sep. 12, 2017, 4 pages.

(Continued)

*Primary Examiner* — Nanci N Wong
(74) *Attorney, Agent, or Firm* — Ryan, Mason & Lewis, LLP

(57) ABSTRACT

An apparatus includes at least one processing device comprising a processor coupled to a memory. The processing device is configured to process host input-output operations received in a first storage system from at least one host device, the host input-output operations being placed in a first storage queue of the first storage system to await access to one or more backend storage devices of the first storage system, to process replication input-output operations in the first storage system for delivery to a second storage system, the replication input-output operations being placed in a second storage queue of the first storage system to await access to the one or more backend storage devices of the first storage system, and to dynamically adjust priorities of the respective first and second storage queues for access to the one or more backend storage devices in accordance with one or more priority adjustment criteria.

20 Claims, 5 Drawing Sheets

(56) References Cited

U.S. PATENT DOCUMENTS

| | | | | |
|---|---|---|---|---|
| 2015/0143053 | A1* | 5/2015 | Quimbey | G06F 12/0888 711/133 |
| 2017/0177222 | A1 | 6/2017 | Singh et al. | |
| 2020/0019521 | A1 | 1/2020 | Solanki et al. | |
| 2020/0026606 | A1 | 1/2020 | Farnum et al. | |
| 2021/0266651 | A1* | 8/2021 | Luo | H04L 47/788 |
| 2022/0283962 | A1* | 9/2022 | Hwang | G06F 13/18 |
| 2022/0350755 | A1* | 11/2022 | Hahn | G06F 13/4295 |
| 2022/0374167 | A1 | 11/2022 | Mallick et al. | |
| 2023/0195656 | A1* | 6/2023 | Walker | G06F 9/30043 711/154 |
| 2023/0229314 | A1 | 7/2023 | Chen et al. | |
| 2023/0297238 | A1 | 9/2023 | Mallick et al. | |
| 2023/0325074 | A1 | 10/2023 | Achkinazi et al. | |
| 2023/0325089 | A1* | 10/2023 | Rasal | G06F 3/0659 711/154 |
| 2023/0325114 | A1 | 10/2023 | Achkinazi et al. | |

OTHER PUBLICATIONS

VMware, "VMware ESX Server," Product Datasheet, 2007, 4 pages.

Wikipedia, "Host Adapter," https://en.wikipedia.org/wiki/Host_adapter, Jul. 19, 2021, 4 pages.

Wikipedia, "iSCSI," https://en.wikipedia.org/wiki/ISCSI, Dec. 22, 2021, 10 pages.

Wikipedia, "NVM Express," https://en.wikipedia.org/wiki/NVM_Express, Jan. 13, 2022, 18 pages.

A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.

Wikipedia, "Remote Direct Memory Access," https://en.wikipedia.org/wiki/Remote_direct_memory_access, Jan. 30, 2021, 3 pages.

M. Hoyt, "ScaleIO Tech Overview and Concepts: SDS-SAN vs SDS-Array," https://www.thinkahead.com/TheLAB/scaleio-tech-overview-concepts-sds-san-vs-sds-array/, Apr. 5, 2017, 16 pages.

EMC Corporation, "EMC ScaleIO Architectural and Functional Overview," EMC White Paper, Dec. 2013, 13 pages.

Dell EMC, "Dell EMC VxFlex OS: Networking Best Practices and Design Considerations," Dell EMC White Paper, Jul. 2018, 38 pages.

NVM Express, "NVM Express Base Specification, Revision 2.0c," NVM Express, Oct. 4, 2022, 458 pages.

Mellanox Technologies, "RoCE vs. iWARP Competitive Analysis," White Paper, Feb. 2017, 6 pages.

EMC Corporation, "EMC ScaleIO Design Considerations and Best Practices," EMC White Paper, Jun. 2016, 30 pages.

U.S. Appl. No. 17/964,560 filed in the name of Igor Achkinazi et al. filed Oct. 12, 2022, and entitled "Host-Based Locality Determination Using Locality Log Pages."

U.S. Appl. No. 18/335,240 filed in the name of Igor Achkinazi et al. filed Jun. 15, 2023, and entitled "Storage System with Automated Filtering of Discovery Information Utilizing Specified Configuration Domains."

* cited by examiner

STORAGE SYSTEM WITH DYNAMIC FAIR QUEUE SCHEDULING OF HOST AND REPLICATION INPUT-OUTPUT OPERATIONS

FIELD

The field relates generally to information processing systems, and more particularly to storage in information processing systems.

BACKGROUND

Storage arrays and other types of storage systems are typically accessed by host devices over a network. Applications running on the host devices each include one or more processes that issue input-output (IO) operations directed to particular logical storage volumes or other logical storage devices, for delivery by the host devices over selected paths to storage ports of the storage system. Different ones of the host devices can run different applications with varying workloads and associated IO patterns. Additional IO operations are typically generated in performing various data services such as replication of logical storage volumes. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

In some storage systems, application IO operations from one or more host devices compete for storage system resources with replication IO operations generated in accordance with one or more replication processes. This can cause the host IO operations and/or the replication IO operations to receive insufficient storage resources at various times, depending for example on the relative volumes of host IO operations and replication IO operations being processed by the storage system at those times, potentially leading to a significant degradation in performance. A need therefore exists for improved techniques that can avoid these and other drawbacks of conventional approaches.

Illustrative embodiments disclosed herein provide dynamic fair queue scheduling for host IO operations and replication IO operations in accessing backend storage devices of a storage system. Such embodiments advantageously prevent replication IO operations from starving host IO operations for storage resources, and vice versa.

In one embodiment, an apparatus comprises at least one processing device that includes a processor and a memory coupled to the processor. The at least one processing device is illustratively configured to process host IO operations received in a first storage system from at least one host device, with the host IO operations being placed in a first storage queue of the first storage system to await access to one or more backend storage devices of the first storage system. The at least one processing device is further configured to process replication IO operations in the first storage system for delivery to a second storage system, with the replication IO operations being placed in a second storage queue of the first storage system to await access to the one or more backend storage devices of the first storage system. The at least one processing device is still further configured to dynamically adjust priorities of the respective first and second storage queues for access to the one or more backend storage devices in accordance with one or more priority adjustment criteria.

The at least one processing device illustratively comprises at least a portion of the first storage system, such as one or more storage controllers of the first storage system, although numerous other arrangements of one or more processing devices, each comprising processor and memory components, are possible.

In some embodiments, dynamically adjusting priorities of the respective first and second storage queues illustratively comprises utilizing wait time measurements generated for at least one of a completion queue associated with the host IO operations and a replication queue associated with the replication IO operations to determine an adjustment to be made to the priorities of the respective first and second storage queues.

As a more particular example, dynamically adjusting priorities of the respective first and second storage queues in some embodiments comprises generating wait time measurements for respective ones of the first and second storage queues, generating a wait time measurement for the completion queue, generating a wait time measurement for the replication queue, adjusting the wait time measurement for the first storage queue based at least in part on the wait time measurement for the completion queue, adjusting the wait time measurement for the second storage queue based at least in part on the wait time measurement for the replication queue, comparing the adjusted wait time measurement for the first storage queue to the adjusted wait time measurement for the second storage queue, and dynamically adjusting priorities of the respective first and second storage queues based at least in part on a result of the comparing.

Illustrative embodiments disclosed herein advantageously provide improved balancing of host IO operations with replication IO operations in accessing storage resources, so as to significantly improve overall storage system performance.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
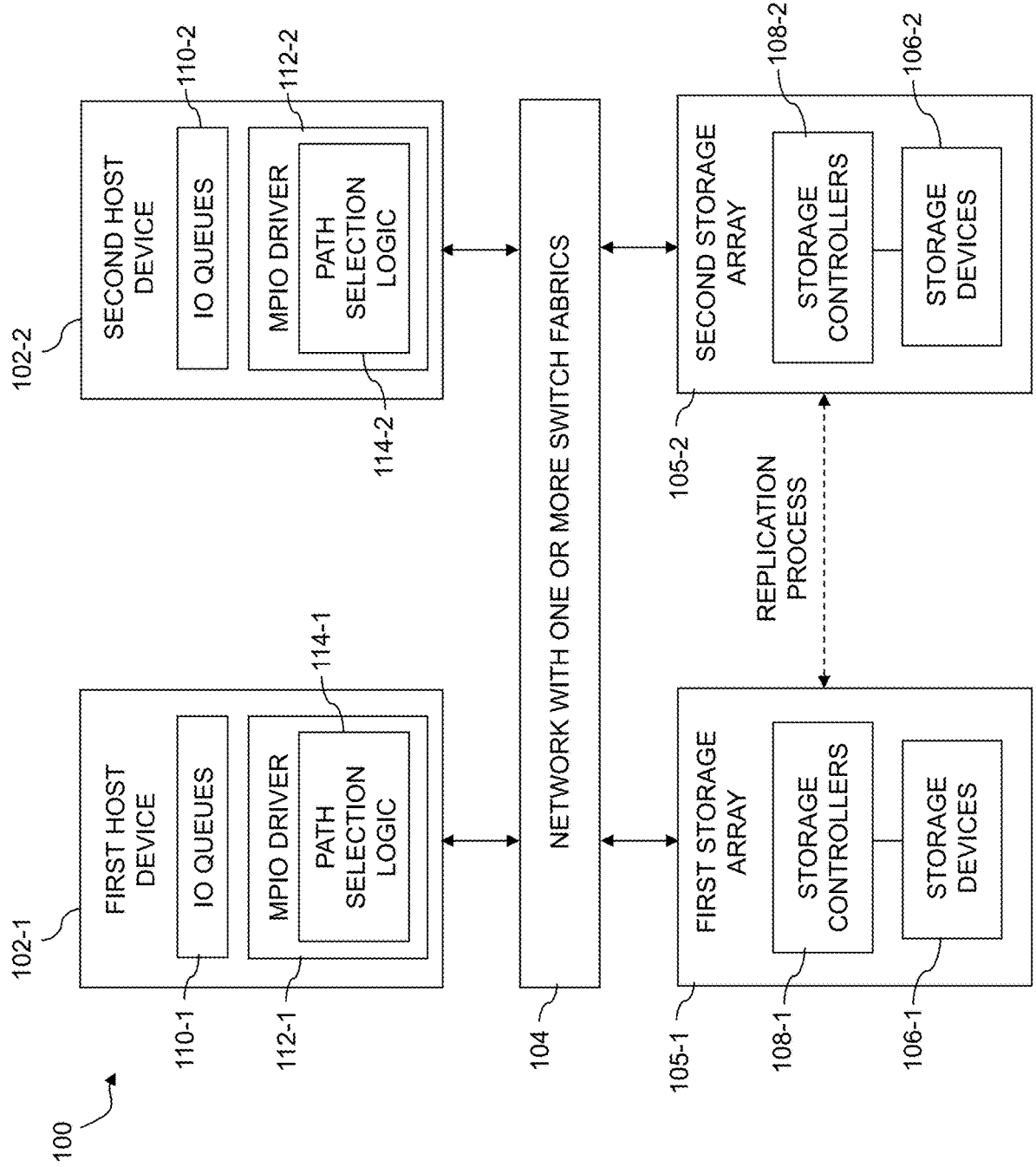
FIG. 1 is a block diagram of an information processing system configured with functionality for dynamic fair queue scheduling of host and replication IO operations in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, also collectively referred to herein as first and second storage arrays 105, or simply storage arrays 105. For example, in some embodiments the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device and/or a single storage array.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The first and second storage arrays 105-1 and 105-2 comprise respective sets of storage devices 106-1 and 106-2, collectively referred to herein as storage devices 106, coupled to respective sets of storage controllers 108-1 and 108-2, collectively referred to herein as storage controllers 108. The storage controllers 108 may comprise, for example, storage processors, service processors, and/or other arrangements of processing circuitry configured to process IO operations received by the corresponding storage array. The term "storage controller" as used herein is therefore intended to be broadly construed, so as to encompass these and other arrangements, such as processing devices that are more particularly referred to herein as storage array processors. Each of the storage controllers 108 illustratively has one or more ports associated therewith for supporting communications between the storage arrays 105 and the host devices 102 over the network 104.

The storage devices 106 may be viewed as illustrative examples of what are more generally referred to herein as "backend storage devices" of the storage arrays 105. Such storage devices in the FIG. 1 embodiment are illustratively shown as being located within their respective corresponding storage arrays, but in other embodiments may be located at least in part externally to their respective corresponding storage arrays.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, and spin torque transfer magneto-resistive RAM (STT-MRAM). These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices. In some embodiments, at least one of the storage arrays 105 illustratively comprises one or more PowerMax™ or PowerStore™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is a scale-out all-flash content addressable storage array distributed over multiple storage nodes.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 illustratively implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. The above-noted LUNs are examples of what are more generally referred to herein as logical storage volumes, or still more generally, logical storage devices.

The read and write commands in some embodiments more particularly comprise SCSI commands, although other types of commands may be used in other embodiments, including commands that are part of a standard command set, such as NVMe commands, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices.

The storage devices 106 may therefore be viewed as comprising respective LUNs or other logical storage volumes.

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those applications execute, from one server to another server.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with the NVMe storage access protocol, as described in the NVM Express Base Specification, Revision 2.0c, October 2022, and its associated NVM Express Command Set Specification and NVM Express TCP Transport Specification, all of which are incorporated by reference herein. Other storage access protocols of this type that may be utilized in illustrative embodiments disclosed herein include NVMe over Fabric, also referred to as NVMe-OF, and NVMe over Transmission Control Protocol (TCP), also referred to as NVMe/TCP.

In some embodiments, the storage arrays 105 may be arranged in a configuration in which one of the storage arrays 105 is designated as a local storage array relative to at least one of the host devices 102, and the other one of the storage arrays 105 is designated as a remote storage array relative to at least one of the host devices 102. For example, the storage arrays may be arranged in a metro and/or stretched ("metro/stretched") configuration or other active-active configuration, or another type of configuration relative to one another that involves local-remote designations.

As a more particular illustration, the first and second storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The first and second storage arrays 105-1 and 105-2 in some embodiments are illustratively configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

Other examples of replication processes include various types of snapshot-based replication processes such as those referred to elsewhere herein.

A given logical storage device implemented on one or both of the storage arrays 105 in the system 100 illustratively comprises a set of one or more LUNs or other logical storage volumes of one or both of the storage arrays 105. Each such LUN or other logical storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides path selection functionality for host IO operations using respective instances of path selection logic 114-1 and 114-2 implemented within the MPIO drivers 112.

The MPIO drivers 112 may comprise, for example, otherwise conventional MPIO drivers, such as PowerPath® drivers from Dell Technologies. Other types of MPIO drivers from other driver vendors may be used in illustrative embodiments herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Such IO operations generated by application processes executing on the host device 102-1 are considered examples of what are more generally referred to herein as "host IO operations." Host IO operations are distinguished herein from additional IO operations associated with one or more replication processes, which are more generally referred to herein as "replication IO operations." References herein to IO operations generally should be understood to refer to host IO operations unless otherwise indicated.

The paths over which the IO operations are sent from the host device 102-1 to the storage arrays 105 illustratively comprise paths associated with respective initiator-target pairs, with each initiator comprising a port of a single-port or multi-port host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device port and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of one of the storage arrays 105. The corresponding logical storage device illustratively comprises a LUN or other logical storage volume to which the particular IO operation is directed.

A given retry of a failed IO operation under such a path selection algorithm can select a path having a different host device port and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104. The MPIO driver 112-2 of host device 102-2 is assumed to be similarly configured.

As indicated above, in some storage systems, application IO operations from one or more host devices compete for storage system resources with replication IO operations generated in accordance with one or more replication processes. This can cause the host IO operations and/or the replication IO operations to receive insufficient storage resources at various times, depending for example on the relative volumes of host IO operations and replication IO operations being processed by the storage system at those times, potentially leading to a significant degradation in performance.

Illustrative embodiments disclosed herein overcome these and other drawbacks of conventional approaches by providing dynamic fair queue scheduling for host IO operations and replication IO operations in accessing backend storage devices of a storage system. Such embodiments advantageously prevent replication IO operations from starving host IO operations for storage resources, and vice versa. These embodiments therefore advantageously address and alleviate problems that might otherwise arise when processing both host IO operations and replication IO operations in a storage system.

For example, in the system 100 of FIG. 1, the first storage array 105-1 is illustratively configured to process host IO operations received therein from at least one of the host devices 102. The first storage array 105-1 places the host IO operations in a first storage queue of the first storage array to await access to one or more backend storage devices of the first storage array. The first storage array 105-1 is further configured to process replication IO operations for delivery to the second storage array 105-2 in accordance with at least one replication process that is carried out between the first and second storage arrays, as generally indicated by the dashed horizontal line in the figure. The first storage array 105-1 places the replication IO operations in a second storage queue of the first storage array to await access to the one or more backend storage devices of the first storage array. Moreover, the first storage array 105-1 dynamically adjusts priorities of the respective first and second storage queues for access to the one or more backend storage devices in accordance with one or more priority adjustment criteria, as will be described in more detail below. Examples of such priority adjustment criteria include comparisons based at least in part on wait time measurements for the first and second storage queues, as will be described in more detail elsewhere herein.

These and other aspects of the dynamic fair queue scheduling functionality of the first storage array 105-1 are illustratively performed at least in part by or under the control of at least one of its storage controllers 108-1. Such a storage controller is considered an illustrative example of what is more generally referred to herein as "at least one processing device" comprising a processor coupled to a memory.

Accordingly, at least one processing device as that term is broadly used herein illustratively comprises at least a portion of the first storage array 105-1, such as one or more storage controllers 108-1 of the first storage array 105-1, although numerous other arrangements of one or more processing devices, each comprising processor and memory components, are possible.

The above-noted first and second storage queues are not explicitly shown in the figure, but are illustratively implemented at least in part using one or more internal memories associated with or otherwise accessible to the storage controllers 108-1. Numerous other arrangements can be utilized to implement the first and second storage queues, as well as other queues referred to herein, such as completion queues and replication queues, as will be readily apparent to those skilled in the art. An exemplary arrangement of multiple queues, including first and second storage queues, a completion queue and a replication queue, is shown in the illustrative embodiment of FIG. 4, although again it is to be appreciated that different numbers, types and arrangements of queues can be used in other embodiments. For example, a given storage system can include more than two storage queues, possibly providing multiple levels of priority for each of a set of host IO operations and a set of replication IO operations, and/or multiple instances of at least one of a completion queue and a replication queue, as well as additional or alternative queues. Terms such as "storage queue," "completion queue" and "replication queue" as used herein are therefore intended to be broadly construed.

In some embodiments, the above-noted dynamically adjusting priorities of the respective first and second storage queues illustratively comprises, for example, generating wait time measurements for the first and second storage queues, generating wait time measurements for at least one of a completion queue associated with completed ones of the host IO operations and a replication queue associated with the replication IO operations being delivered to the second storage array 105-2, and dynamically adjusting the priorities of the respective first and second storage queues based at least in part on the wait time measurements for the first and second storage queues and the wait time measurements for the at least one of the completion queue and the replication queue.

Additionally or alternatively, dynamically adjusting priorities of the respective first and second storage queues in some embodiments illustratively comprises assigning values to respective first and second time slices of a designated processing interval to the first and second storage queues, to establish initial relative priorities for the first and second storage queues, and then varying the assigned values of the first and second time slices over time to dynamically adjust the relative priorities of the first and second storage queues.

For example, the values assigned to the first and second time slices may comprise respective percentages of a time duration of the processing interval. As another example, the values assigned to the first and second time slices may comprise respective numbers of IO operations associated with the processing interval. The latter arrangement may more particularly involve assigning units of IO operations, also referred to herein as "IO contexts," to the first and second time slices.

In some embodiments, dynamically adjusting priorities of the respective first and second storage queues illustratively comprises utilizing wait time measurements generated for at least one of a completion queue associated with the host IO operations and a replication queue associated with the replication IO operations to determine an adjustment to be made to the priorities of the respective first and second storage queues.

For example, at least one of the wait time measurements may comprise a moving average, such as a simple moving average of a first designated number of previous IO operations, or an exponential moving average of a second designated number of previous IO operations. The first and second designated numbers may be the same number, such as a selected number N of previous IO operations as used in additional examples described elsewhere herein.

In some embodiments, dynamically adjusting priorities of the respective first and second storage queues more particularly comprises generating wait time measurements for respective ones of the first and second storage queues, generating a wait time measurement for the completion queue, generating a wait time measurement for the replication queue, adjusting the wait time measurement for the first storage queue based at least in part on the wait time measurement for the completion queue, adjusting the wait time measurement for the second storage queue based at least in part on the wait time measurement for the replication queue, comparing the adjusted wait time measurement for the first storage queue to the adjusted wait time measurement for the second storage queue, and dynamically adjusting priorities of the respective first and second storage queues based at least in part on a result of the comparing.

For example, dynamically adjusting priorities of the respective first and second storage queues based at least in part on a result of the comparing illustratively comprises, responsive to the adjusted wait time measurement for the first storage queue being greater than the adjusted wait time measurement for the second storage queue by more than a first threshold amount, increasing the priority of the first storage queue and decreasing the priority of the second storage queue. Alternatively, dynamically adjusting priorities of the respective first and second storage queues based at least in part on a result of the comparing illustratively comprises, responsive to the adjusted wait time measurement for the second storage queue being greater than the adjusted wait time measurement for the first storage queue by more than a second threshold amount, increasing the priority of the second storage queue and decreasing the priority of the first storage queue. The first and second threshold amounts may be the same threshold amount, or different threshold amounts.

The above-described arrangement may be configured such that increasing the priority of one of the first and second storage queues comprises increasing the priority by a designated delta value.

Additionally or alternatively, this example arrangement may be configured such that the priority of the first storage queue cannot be decreased below a designated minimum value. Minimum and/or maximum values for the priorities of the respective first and second storage queues can be similarly established in other embodiments.

In some embodiments, adjusting the wait time measurement for the first storage queue based at least in part on the wait time measurement for the completion queue illustratively comprises summing the respective wait time measurements for the first storage queue and the completion queue. Similarly, adjusting the wait time measurement for the second storage queue based at least in part on the wait time measurement for the replication queue illustratively comprises summing the respective wait time measurements for the second storage queue and the replication queue.

Additional or alternative functions other than the above-noted summing can be used in other embodiments to adjust the wait time measurements for respective ones of the first and second storage queues based at least in part on wait time measurements for the respective corresponding completion queue and replication queue.

Further illustrative embodiments will now be described with respect to particular detailed examples. In these examples, it is assumed without limitation that the first storage array 105-1 implements a snapshot-based replication process, in which an orchestrator of the first storage array 105-1 issues replication IO operations to local or network-attached backend storage devices and then forwards corresponding replication IOs to a remote system, illustratively the second storage array 105-2. Such an orchestrator illustratively comprises an IO forwarding engine, and may be implemented at least in part using one or more of the storage controllers 108-1 of the first storage array 105-1. While the above-noted snapshot-based replication process is running, the first storage array 105-1 also receives host IO operations from one or more of the host devices 102-1. The illustrative embodiments to be described implement dynamic fair queue scheduling to prevent the replication IO operations from starving the host IO operations for needed storage resources, and vice versa.

Consider by way of example two flows of IO operations in the first storage array 105-1. The first flow includes host IOs coming from a host and being put into a storage queue to be sent over an internal storage network to one or more internal storage servers so as to access backend storage devices. When a reply to a given such host IO comes back over the internal storage network, this host IO is posted into a first outgoing queue, back to the host. The first outgoing queue back to the host is an example of what is more generally referred to herein as a "completion queue," and is also denoted CQ.

The second flow includes replication IOs associated with snapshot-based replication orchestration. Such replication IOs are also put into a storage queue to be sent over the internal storage network to the one or more internal storage servers in order to access the backend storage devices. When a reply to a given such replication IO comes back over the internal storage network, this replication IO is posted into a second outgoing queue, towards the remote system, illustratively the second storage array 105-2. The second outgoing queue towards the remote system is an example of what is more generally referred to herein as a "replication queue," and is also denoted RQ.

Potential starvation for storage resources can arise in this scenario if both the host IOs and the replication IOs are placed into the same storage queue to be sent over the internal storage network to the one or more internal storage servers so as to access backend storage devices. More particularly, in such an arrangement, the first and second different IO flows compete with one another for access to the same storage resources via the same storage queue, leading to potential resource starvation for one or both flows, and associated performance degradations.

In some embodiments, this potentially problematic situation is addressed by using first and second separate storage queues for the above-noted first and second flows, with dynamic fair queue scheduling between the first and second storage queues. More particularly, by way of example, a first storage queue SQ1 is utilized for host IOs and a second storage queue SQ2 is utilized for replication IOs, with different time slices assigned for the two storage queues SQ1 and SQ2 to dynamically adapt their respective priorities in accessing the backend storage devices via the internal storage network.

The assigned time slices illustratively determine how many IO operations, possibly specified in terms of units of IO or IO contexts, can be serviced onto the internal storage network from one of the storage queues SQ1 and SQ2 before switching to the other one of the storage queues SQ1 and SQ2. The times slices in some embodiments determine, for example, how much CPU time is allocated to processing of IOs from a given storage queue before processing moves on to IOs from the other storage queue.

It is assumed for these examples that the host IOs have a higher priority than the replication IOs, and so SQ1 is initially assigned a larger time slice than SQ2 such that SQ1 initially has a higher priority than SQ2. The dynamic fair queue scheduling adjusts the relative priorities of SQ1 and SQ2 over time in order to impose scheduling fairness so as to avoid replication IOs from starving host IOs for storage resources, or vice versa. Accordingly, the relative priorities of SQ1 and SQ2 change dynamically over time.

In some embodiments, these dynamic adjustments in the relative priorities of SQ1 and SQ2 are made at least in part using current states of CQ and RQ as feedback to control the priority adjustments. For example, if a lower-priority storage queue uses up its assigned time slice and still has IO contexts to be scheduled, that storage queue may have its time slice increased to ensure that it gets more CPU time.

Assume by way of example that the first storage array 105-1 includes at least the following queues, although it is to be appreciated that different types, numbers and arrangements of queues can be used in other embodiments:

1. SQ1, receives host IOs, higher priority;
2. SQ2, receives replication IOs, lower priority;
3. CQ, receives completion host IOs directed back to host; and
4. RQ, receives replication IOs directed towards remote system.

An example arrangement of such queues will be described below in conjunction with the embodiment of FIG. 4.

Further assume that CQ and RQ are each serviced using respective first-in first-out (FIFO) schedulers working on their respective single queues. These CQ and RQ schedulers are denoted FIFO-CQ and FIFO-RQ, respectively.

The storage queues SQ1 and SQ2 are collectively serviced using a Dynamic Fair Queue Scheduler (DFQS) of the type disclosed herein. This DFQS is illustratively denoted DFQS-SQ1SQ2. It is configured to adjust the relative priorities of SQ1 and SQ2 based at least in part on wait time measurements made for IOs in SQ1 and SQ2 as well as wait time measurements for their respective associated CQ and RQ.

For each of the queues SQ1, SQ2, CQ and RQ, the corresponding wait time measurements are illustratively generated by periodically calculating a moving average of the time IOs spend in that queue. Accordingly, moving average wait time measurements TMA_sq1, TMA_sq2, TMA_cq and TMA_rq are periodically calculated for SQ1, SQ2, CQ and RQ, respectively, where TMA denotes Time Moving Average for each respective queue.

The TMA may be calculated, for example, as a simple moving average that characterizes the wait-in-queue time of the last N IO contexts divided by N, where N is a pre-configured or otherwise designated value indicating the number of previous IO contexts to consider in computing the TMA:

$$TMA = \left(\frac{T1 + T2 + \ldots\ Tn}{N}\right).$$

As another example, an exponential moving average based on the latest IO context wait-in-queue time T, the previous TMA_prev and preconfigured number N of previous IO contexts, where the first N TMAs are calculated as simple moving averages:

$$TMA = T * \frac{2}{1+N} + TMA_{prev} * \left(1 - \frac{2}{1+N}\right).$$

The TMAs for each queue are illustratively calculated for each IO context scheduled from that queue, illustratively in conjunction with removal of the IO context from the queue, although other arrangements and associated computations can be used.

The DFQS is configured to perform periodic checks in order to determine if an adjustment in the relative priorities of SQ1 and SQ2 is needed. For example, for the host IO queue SQ1, a time quantum $TQ_1$ is calculated as follows:

$$TQ_1 = TMA\_sq1 + TMA\_cq,$$

and for the replication IO queue SQ2, a time quantum $TQ_2$ is calculated as follows:

$$TQ_2 = TMA\_sq2 + TMA\_rq.$$

The periodic check illustratively compares the time quanta $TQ_1$ and $TQ_2$ of respective queues SQ1 and SQ2, based on the current TMA values, and adjusts time slicing between SQ1 and SQ2 if necessary. For example, if $TQ_2$ is larger than $TQ_1$, then the time slice for SQ2 is increased by a designated delta amount, which may be a pre-configured value. The time slice for SQ1 is decreased accordingly. The next periodic check determines if this adjustment was sufficient or if an additional time slice adjustment is needed. Thresholds may be established for use in the above-noted comparisons to ensure that excessive adjustments are not made responsive to minimal fluctuations in the computed time quanta.

The above-noted adjustments in relative priorities of SQ1 and SQ2 are examples of adjustments that are made responsive to one or more priority adjustment criteria. Accordingly, detection of an above-threshold difference in relative values of the above-noted time quanta $TQ_1$ and $TQ_2$ of respective storage queues SQ1 and SQ2 is an example of a "priority adjustment criterion" as that term is broadly used herein. Numerous other types of priority adjustment criteria can be used to control dynamic adjustments in relative priorities of the storage queues SQ1 and SQ2 in other embodiments.

In some embodiments, the time slices for the two storage queues SQ1 and SQ2 are given in terms of respective percent values. For example, the time slices can be configured in terms of milliseconds, where a particular total number of milliseconds (e.g., 100 ms) for the time slices for the two storage queues is considered 100%. Alternatively, the time slices for the storage queues can be configured in terms of number of units processed, such as five units, where such units are also referred to herein as IO contexts. For example, each set of five units can be allocated 60% to SQ1 and 40% to SQ2, as illustrated below in conjunction with FIG. 5. Because of different network conditions (e.g., latency, throughput, etc.) for delivery of IOs from the queues CQ and RQ, the DFQS in these examples will most likely not automatically skew to a 50%-50% condition if both host IOs and replication IOs are coming at the same rate.

The configuration of the above-described DFQS utilized to dynamically adapt the relative priorities of the two storage queues SQ1 and SQ2 illustratively involves setting at least a subset of the following parameters:

1. Full time slice in terms of milliseconds (e.g., 100 ms), or in terms of units (e.g., 5 or 10 units), also referred to herein as IO contexts.
2. Minimum percentage of time slice for high priority queue, where its assigned time slice cannot go lower than this value regardless of the calculated time quanta of the queues SQ1 and SQ2. For example, there may be a hard limit for higher priority SQ1 to serve host IOs at a particular minimum percentage, such as 60%.
3. Delta in percentage, also referred to as granularity, for a given time slice adjustment.
4. Time period for periodic check of time slice adjustment.
5. Moving average calculation parameters, simple or exponential, number of last values to use as a base, etc.

Such parameters can be wholly or partially pre-configured or otherwise designated based at least in part on the particular needs of a given implementation.

Again, the particular dynamic fair queue scheduling functionality described above can be varied in other embodiments. For example, the computations and associated priority adjustments can be varied.

At least portions of the functionality for dynamic fair queue scheduling in illustrative embodiments is implemented within or otherwise utilizing the storage controller 108-1 of the first storage array 105-1. For example, one or more such storage controllers 108-1 are illustratively configured to control performance of one or more steps of the example process to be described below in conjunction with FIG. 2, possibly with the use of associated dynamic fair queue scheduling logic.

Although at least one of the storage controllers 108-1 is utilized to perform certain aspects of the functionality for dynamic fair queue scheduling in some embodiments, this is by way of illustrative example only, and other embodiments need not utilize storage controllers in implementing such functionality. For example, additional or alternative logic circuitry and/or system components can be configured to implement aspects of the functionality for dynamic fair queue scheduling in other embodiments.

It is assumed that the second storage array 105-2 is configured in a manner similar to that described above and elsewhere herein for the first storage array 105-1. The second storage array 105-2 is therefore similarly configured to perform at least portions of the disclosed functionality for dynamic fair queue scheduling. Accordingly, aspects of functionality for dynamic fair queue scheduling described above in the context of the first storage array 105-1 and its storage controllers 108-1 are assumed to be similarly performed by the other storage array 105-2 and its storage controllers 108-2.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, storage controllers 108, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, additional or alternative logic instances or other components implemented in the storage arrays 105 can be used to perform at least portions of the functionality for dynamic fair queue scheduling.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising at least first and second storage systems and at least one host device that communicates with at least the first storage system over a network. The host device illustratively comprises a given one of the first and second host devices 102-1 and 102-2, and the storage system illustratively comprises at least one of the first and second storage arrays 105. The storage system is assumed to comprise a plurality of queues, including at least first and second storage queues, a completion queue and a replication queue.

Figure 2:
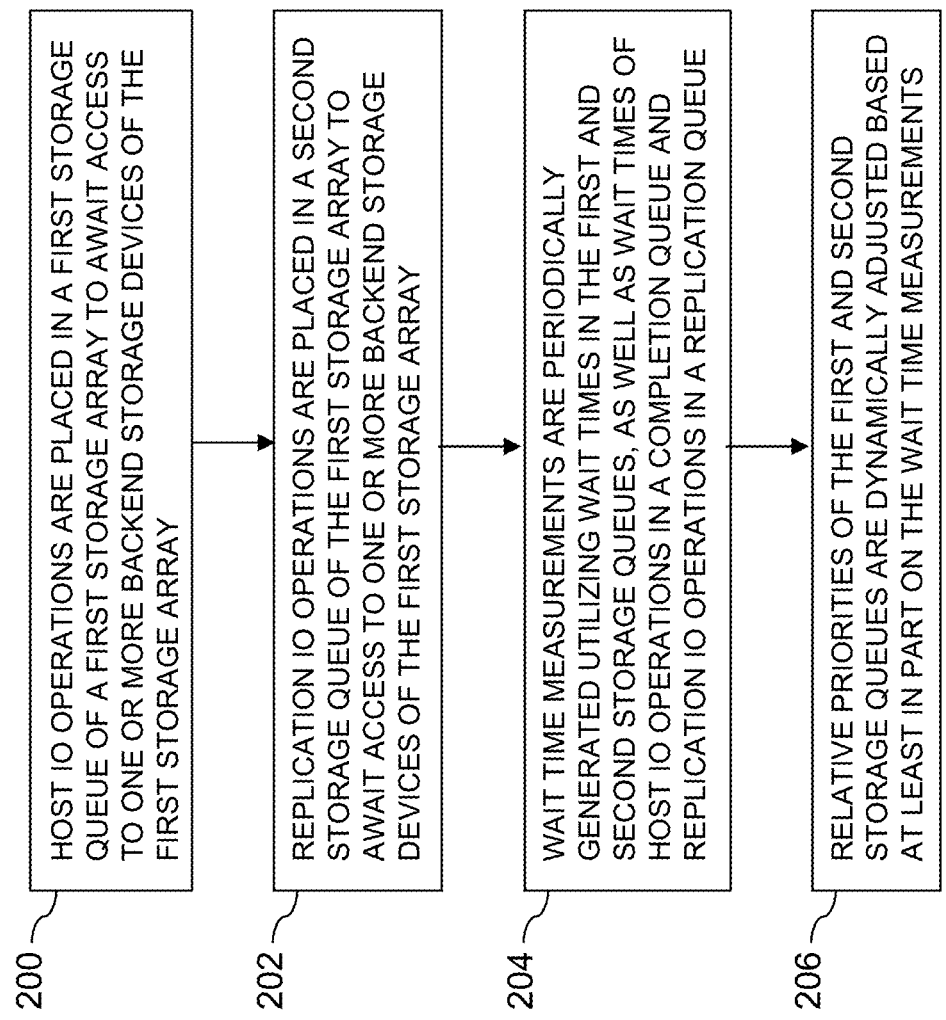
FIG. 2 is a flow diagram illustrating an example process for dynamic fair queue scheduling of host and replication IO operations in an illustrative embodiment.

The steps of the FIG. 2 process are illustratively performed at least in part by or under the control of one or more storage controllers of a storage system, such as at least one of the storage controllers 108-1 of the first storage array 105-1, although other arrangements of system components can control or perform at least portions of one or more of the steps in other embodiments. The process may be viewed as an example of an algorithm implemented by dynamic fair queue scheduling logic of the first storage array 105-1, where such logic is illustratively deployed in one or more of the storage controllers 108-1.

In step 200, host IO operations received in a first storage array from at least one host device are placed in a first storage queue of the first storage array to await access to one or more backend storage devices of the first storage array. Such IO operations are illustratively generated by one or more processes of at least one application executing on the at least one host device. The IO operations are sent over selected paths from the at least one host device to the first storage array under the control of an MPIO layer of the at least one host device.

In step 202, replication IO operations associated with at least one replication process are placed in a second storage queue of the first storage array to await access to one or more backend storage devices of the first storage array. For example, the replication IO operations may be generated in accordance with a replication process that involves replicating one or more logical storage volumes from the first storage array to a second storage array, where the first storage array illustratively comprises a production storage array and the second storage array illustratively comprises a remote storage array or other type of backup storage array. The replication process can comprise a host-side replication process that is controlled primarily by one or more host devices, a storage-side replication process that is controlled primarily by one or more of the first and second storage systems, or a hybrid process in which one or more host devices and one or more of the first and second storage systems collaborate with one another in controlling the replication process. The term "replication process" as used herein is therefore intended to be broadly construed, so as to encompass any of a wide variety of different arrangements involving replication of data between storage systems, including the previously-mentioned snapshot-based replication process.

In step 204, wait time measurements are periodically generated utilizing wait times of host IO operations in the first storage queue and wait times of replication IO operations in the second storage queue, as well as wait times of host IO operations in a completion queue and replication IO operations in a replication queue. More detailed examples of such wait time measurements are provided elsewhere herein.

In step 206, relative priorities of the first and second storage queues are dynamically adjusted based at least in part on the wait time measurements. For example, time slices assigned to the respective first and second storage queues are illustratively adjusted in order to effect an adjustment in their relative priorities.

Steps 200 through 206 may be repeated in a substantially continuous manner as additional host IO operations and replication IO operations are generated for processing by the first storage array.

The steps of the FIG. 2 process are shown in sequential order for clarity and simplicity of illustration only, and certain steps can at least partially overlap with other steps. Also, different ones of the steps can be performed at least in part by different storage array components, such as additional or alternative components of the storage array.

As indicated above, different instances of the FIG. 2 process can execute at least in part in parallel with one another for different sets of storage queues within a given storage array or other storage system. Additionally or alternatively, multiple additional instances of the FIG. 2 process can be performed for respective ones of one or more additional host devices that share the storage system.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for dynamic fair queue scheduling. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different dynamic fair queue scheduling arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
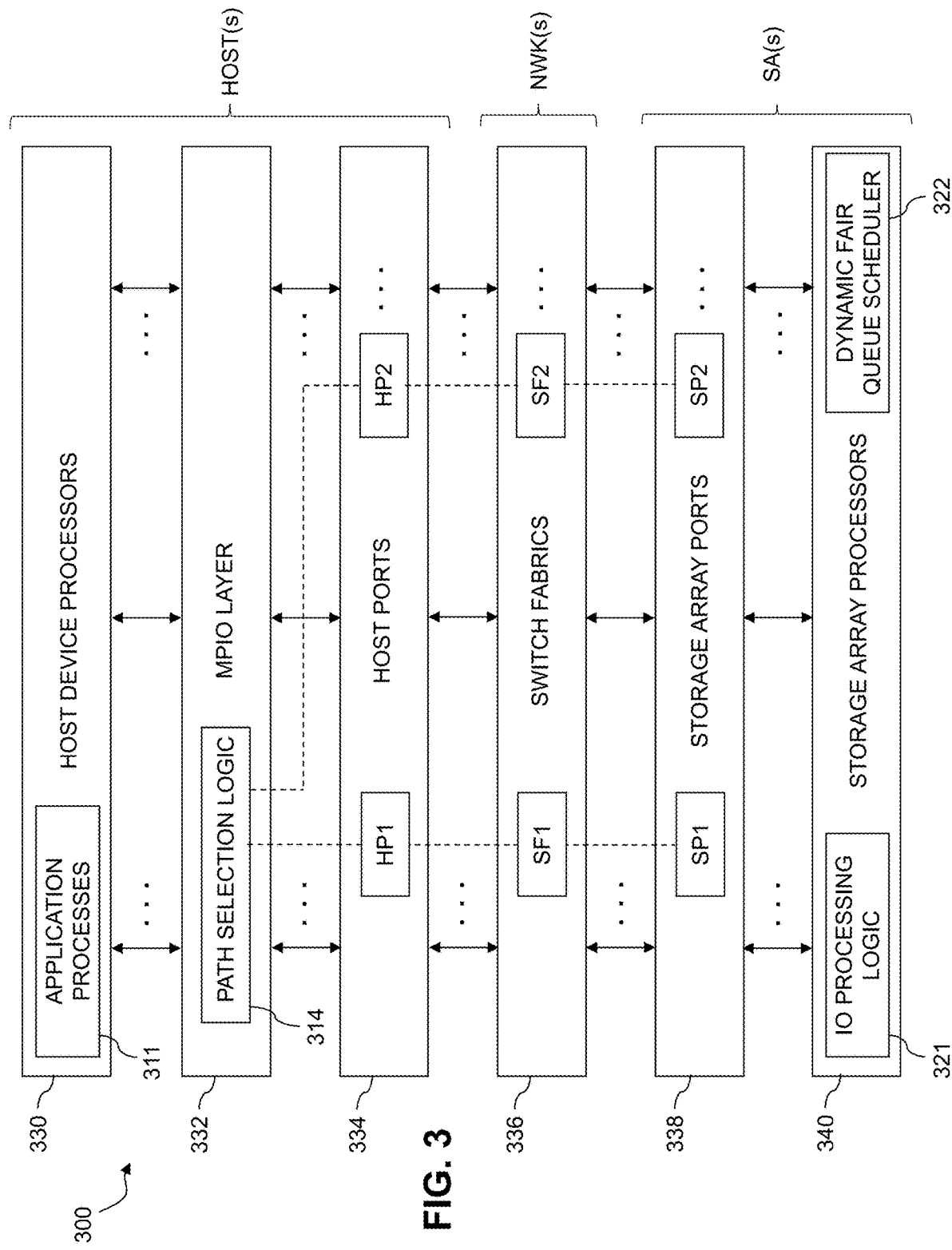
FIG. 3 is a block diagram showing multiple layers of a layered system architecture that includes functionality for dynamic fair queue scheduling of host and replication IO operations in an illustrative embodiment.

Referring now to FIG. 3, another illustrative embodiment is shown. In this embodiment, an information processing system 300 comprises host-side components that include path selection logic 314, and storage-side components that include IO processing logic 321 and a dynamic fair queue scheduler 322. Additional or alternative host-side and storage-side components can be used in other embodiments. The system 300 is configured in accordance with a layered system architecture that illustratively includes a host device processor layer 330, an MPIO layer 332, a host port layer 334, a switch fabric layer 336, a storage array port layer 338 and a storage array processor layer 340. As illustrated in the figure, the host device processor layer 330, the MPIO layer 332 and the host port layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for dynamic fair queue scheduling for host IO operations and replication IO operations. The host IO operations are illustratively generated by one or more application processes 311 running in one or more host device processors of the host device processor layer 330. The replication IO operations are illustratively generated in conjunction with a snapshot-based replication process or other type of replication process that involves replicating data from one storage array to another storage array, such as from a production storage array to a backup storage array.

The functionality for dynamic fair queue scheduling in this embodiment is assumed to be controlled at least in part by the dynamic fair queue scheduler 322, although other arrangements are possible.

The dynamic fair queue scheduling functionality is assumed to include, for example, processing host IO operations received in a first storage array from at least one host device, with the host IO operations being placed in a first storage queue of the first storage array to await access to one or more backend storage devices of the first storage array, and to process replication IO operations in the first storage array for delivery to a second storage array, with the replication IO operations being placed in a second storage queue of the first storage array to await access to the one or more backend storage devices of the first storage array. The dynamic fair queue scheduling functionality further comprises dynamically adjusting priorities of the respective first and second storage queues for access to the one or more backend storage devices in accordance with one or more priority adjustment criteria.

The path selection logic 314 can include multiple distinct path selection logic instances for respective ones of a plurality of host devices of the system 300.

Also, although dynamic fair queue scheduler 322 is illustratively shown as being implemented in the storage array processor layer 340, it can instead be implemented at least part elsewhere within the one or more storage arrays, such as in one or more devices associated with the storage array ports of the storage array port layer 338.

The IO processing logic 321 implemented in the storage array processor layer 340 performs various types of processing for servicing of read requests, write requests and other types of IO operations received from one or more host devices of the system 300. The dynamic fair queue scheduler 322 illustratively implements dynamic fair queue scheduling for host IO operations and replication IO operations as described previously. In some embodiments, there may be separate instances of the IO processing logic 321 and the dynamic fair queue scheduler 322 for each of a plurality of storage arrays of the system 300.

The host-side components including path selection logic 314 operate in conjunction with the storage-side components including IO processing logic 321 and dynamic fair queue scheduler 322 to implement at least portions of the functionality for dynamic fair queue scheduling as disclosed herein.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300, as previously described. As indicated above, the path selection logic 314 in some embodiments operates in conjunction with the IO processing logic 321 and the dynamic fair queue scheduler 322 in implementing at least portions of the functionality for dynamic fair queue scheduling as disclosed herein. Additional or alternative layers and logic circuitry arrangements can be used in other embodiments.

In the system 300, path selection logic 314 is configured to select different paths for sending IO operations from a given host device to a storage array. These paths as illustrated in the figure include a first path from a particular host port denoted HP1 through a particular switch fabric denoted SF1 to a particular storage array port denoted SP1, and a second path from another particular host port denoted HP2 through another particular switch fabric denoted SF2 to another particular storage array port denoted SP2.

These two particular paths are shown by way of illustrative example only, and in many practical implementations there will typically be a much larger number of paths between the one or more host devices and the one or more storage arrays, depending upon the specific system configuration and its deployed numbers of host ports, switch fabrics and storage array ports. For example, each host device in the FIG. 3 embodiment can illustratively have a set of multiple paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the storage arrays of system 300, through their respective instances of components 321 and 322, provide functionality for dynamic fair queue scheduling as disclosed herein, illustratively with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of host ports to accommodate predicted performance needs. In some cases, the number of host ports per host device is on the order of 4, 8 or 16 host ports, although other numbers of host ports could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The host ports of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
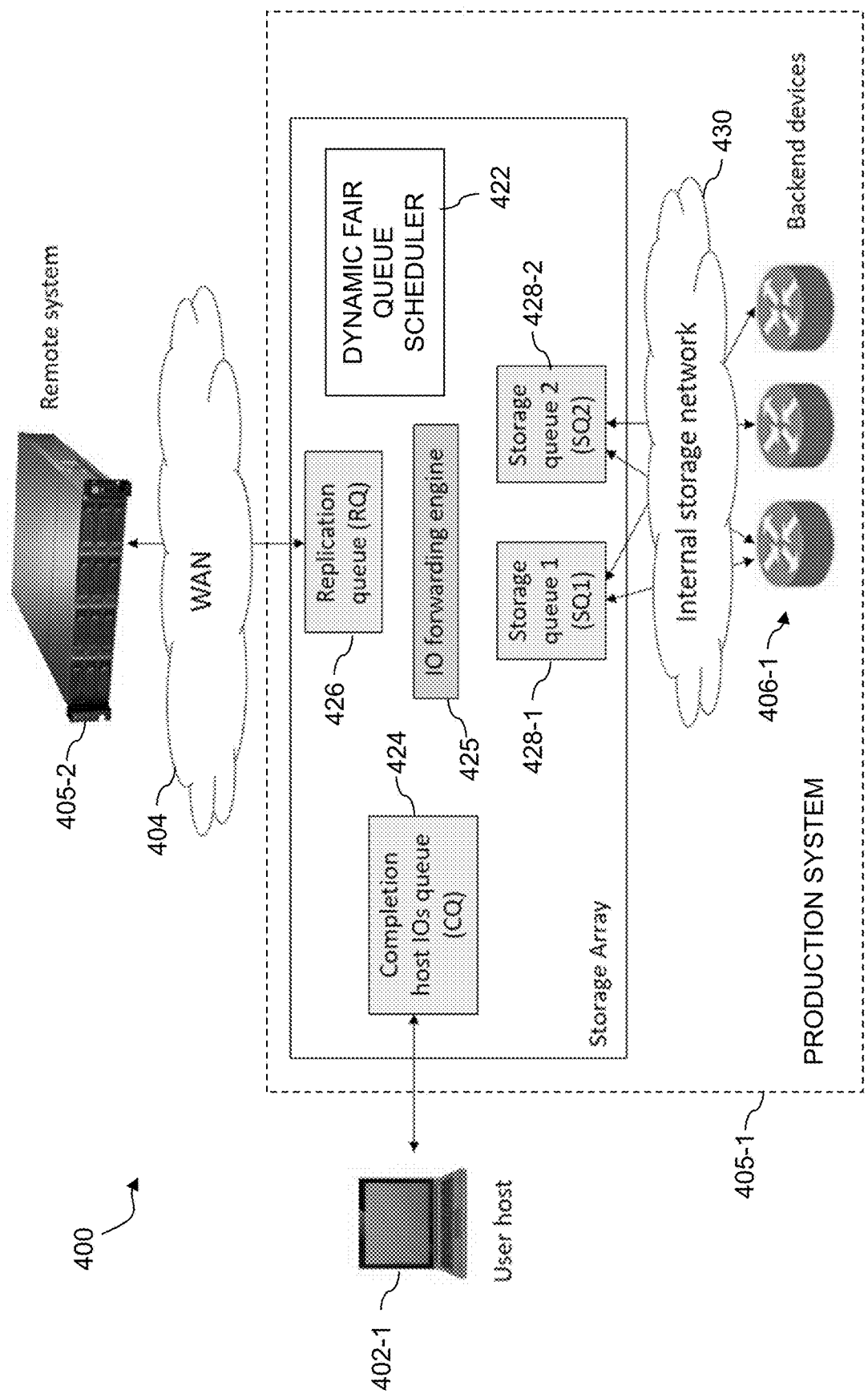
FIG. 4 shows another example of an information processing system configured with functionality for dynamic fair queue scheduling of host and replication IO operations in an illustrative embodiment.

Referring now to FIG. 4, another example of an information processing system 400 is shown. The information processing system 400 is configured with functionality for dynamic fair queue scheduling of host and replication IO operations in an illustrative embodiment. The system 400 comprises a host device 402-1, also referred to as a user host, which communicates with a storage array of a production system 405-1. The production system 405-1 communicates with a remote system 405-2 via a WAN 404 in carrying out a replication process, such as a snapshot-based replication process, in which data is replicated from the production system 405-1 to the remote system 405-2. The storage array of the production system 405-1 comprises a plurality of queues including a completion queue (CQ) 424 for completion host IOs being directed back to the host device 402-1, a replication queue (RQ) 426 for replication IOs being directed to the remote system 405-2, and first and second storage queues 428-1 and 428-2, also denoted herein as SQ1 and SQ2, respectively. The production system 405-1 further includes an internal storage network 430 providing access to backend storage devices 406-1. Although the production system 405-1 is illustrated as comprising a storage array and other components external to the storage array, this is by way of example only, and the production system 405-1 and remote system 405-2 may each be viewed as an example of a "storage array" or other type of "storage system" as those terms are broadly used herein. Accordingly, the internal storage network 430 and backend storage devices 406-1 may be viewed as being internal to the storage array of the production system 405-1 in other embodiments.

Also included in the storage array of the production system 405-1 is a dynamic fair queue scheduler (DFQS) 422 and an IO forwarding engine 425. The DFQS 422 dynamically adjusts the relative priorities of the storage queues SQ1 and SQ2 based at least in part on their respective wait times as well as wait times of the CQ 424 and the RQ 426, in the manner described in more detail elsewhere herein. The IO forwarding engine 425 illustratively controls the flow of IOs into and out of the various queues within the storage array, in accordance with the scheduling implemented by the DFQS 422.

Figure 5:
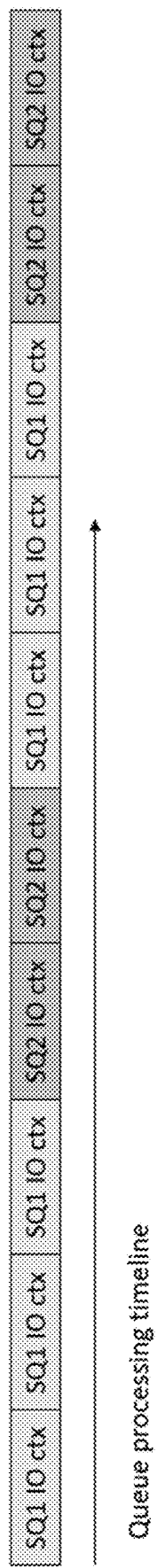
FIG. 5 shows an example queue processing timeline associated with dynamic fair queue scheduling of host and replication IO operations in an illustrative embodiment.

FIG. 5 shows an example queue processing timeline implemented by the DFQS 422 for host IO operations and replication IO operations in an illustrative embodiment. For example, in this embodiment, the DFQS 422 assigns time slices to the respective storage queues SQ1 and SQ2 in order to establish their relative priorities for access to the backend storage devices 406-1 via the internal storage network 430. In this embodiment, the time slices for the storage queues are configured in terms of units processed, such as five units, where such units are also referred to herein as IO contexts. In the relative priorities shown in the figure, each set of five units is allocated 60% to SQ1 and 40% to SQ2. Thus, the first three of the five units service IO contexts ("ctx") from SQ1, and the next two of the five units service IO contexts from SQ2, with the process repeating as shown for the next five units. Other embodiments can configure the time slices in other ways. For example, the time slices can be configured in terms of milliseconds, where a particular total number of milliseconds (e.g., 100 ms) for the time slices for the two storage queues is considered 100%.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for dynamic fair queue scheduling can be performed by different storage controllers or other components in different storage arrays.

Numerous alternative arrangements of these or other features can be used in implementing dynamic fair queue scheduling in other illustrative embodiments.

It is apparent from the foregoing that the illustrative embodiments disclosed herein can provide a number of significant advantages relative to conventional arrangements.

For example, some embodiments configure storage arrays and other types of storage systems to include functionality for dynamic fair queue scheduling.

Such embodiments advantageously overcome difficulties of conventional arrangements. For example, illustrative embodiments can avoid adverse performance impacts that might otherwise arise when replication IO operations cause host IO operations to be starved of storage resources, or vice versa.

The disclosed functionality can be implemented using a wide variety of different arrangements of host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include various types of cloud-based systems. Virtual machines provided in such cloud-based systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a central processing unit (CPU), a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, IO processing logic, dynamic fair queue schedulers, and additional or alternative components. Also, the particular configurations of system and device elements and associated processing operations illustratively shown in the drawings can be varied in other embodiments. For example, a wide variety of different host device and storage system configurations, and associated dynamic fair queue scheduling techniques, can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
    processing host input-output operations received in a first storage system from at least one host device, the host input-output operations being placed in a first storage queue of the first storage system to await access to one or more backend storage devices of the first storage system;
    processing replication input-output operations in the first storage system for delivery to a second storage system, the replication input-output operations being placed in a second storage queue of the first storage system to await access to the one or more backend storage devices of the first storage system; and
    dynamically adjusting priorities of the respective first and second storage queues for access to the one or more backend storage devices in accordance with one or more priority adjustment criteria;
    wherein dynamically adjusting priorities of the respective first and second storage queues comprises utilizing wait time measurements generated for at least one of a completion queue associated with the host input-output operations and a replication queue associated with the replication input-output operations to determine an adjustment to be made to the priorities of the respective first and second storage queues;
    wherein dynamically adjusting priorities of the respective first and second storage queues further comprises:
    generating wait time measurements for respective ones of the first and second storage queues;
    generating a wait time measurement for the completion queue;
    generating a wait time measurement for the replication queue;
    adjusting the wait time measurement for the first storage queue based at least in part on the wait time measurement for the completion queue;
    adjusting the wait time measurement for the second storage queue based at least in part on the wait time measurement for the replication queue;
    comparing the adjusted wait time measurement for the first storage queue to the adjusted wait time measurement for the second storage queue; and
    dynamically adjusting priorities of the respective first and second storage queues based at least in part on a result of the comparing; and
    wherein the method is performed by at least one processing device comprising a processor coupled to a memory.

2. The method of claim 1 wherein the first storage system further comprises, in addition to the first and second storage queues, first and second out-bound queues, the first out-bound queue being for outgoing communications directed from the first storage system to the host device and relating to the host input-output operations, the second out-bound queue being for outgoing communications directed from the first storage system to the second storage system and relating to the replication input-output operations.

3. The method of claim 2 wherein dynamically adjusting priorities of the respective first and second storage queues for access to the one or more backend storage devices further comprises adjusting one or more of the priorities based at least in part on wait times of the first and second storage queues and wait times of the first and second out-bound queues.

4. The method of claim 1 wherein dynamically adjusting priorities of the respective first and second storage queues based at least in part on a result of the comparing comprises one of:
    responsive to the adjusted wait time measurement for the first storage queue being greater than the adjusted wait time measurement for the second storage queue by more than a first threshold amount, increasing the priority of the first storage queue and decreasing the priority of the second storage queue; and
    responsive to the adjusted wait time measurement for the second storage queue being greater than the adjusted wait time measurement for the first storage queue by more than a second threshold amount, increasing the priority of the second storage queue and decreasing the priority of the first storage queue.

5. The method of claim 4 wherein increasing the priority of one of the first and second storage queues comprises increasing the priority by a designated delta value.

6. The method of claim 4 wherein the priority of the first storage queue cannot be decreased below a designated minimum value.

7. The method of claim 1 wherein adjusting the wait time measurement for the first storage queue based at least in part on the wait time measurement for the completion queue comprises summing the respective wait time measurements for the first storage queue and the completion queue.

8. The method of claim 1 wherein adjusting the wait time measurement for the second storage queue based at least in part on the wait time measurement for the replication queue comprises summing the respective wait time measurements for the second storage queue and the replication queue.

9. A computer program product comprising a non-transitory processor-readable storage medium having stored therein program code of one or more software programs, wherein the program code, when executed by at least one processing device comprising a processor coupled to a memory, causes said at least one processing device:
  to process host input-output operations received in a first storage system from at least one host device, the host input-output operations being placed in a first storage queue of the first storage system to await access to one or more backend storage devices of the first storage system;
  to process replication input-output operations in the first storage system for delivery to a second storage system, the replication input-output operations being placed in a second storage queue of the first storage system to await access to the one or more backend storage devices of the first storage system; and
  to dynamically adjust priorities of the respective first and second storage queues for access to the one or more backend storage devices in accordance with one or more priority adjustment criteria;
  wherein dynamically adjusting priorities of the respective first and second storage queues comprises utilizing wait time measurements generated for at least one of a completion queue associated with the host input-output operations and a replication queue associated with the replication input-output operations to determine an adjustment to be made to the priorities of the respective first and second storage queues; and
  wherein dynamically adjusting priorities of the respective first and second storage queues further comprises:
    generating wait time measurements for respective ones of the first and second storage queues;
    generating a wait time measurement for the completion queue;
    generating a wait time measurement for the replication queue;
    adjusting the wait time measurement for the first storage queue based at least in part on the wait time measurement for the completion queue;
    adjusting the wait time measurement for the second storage queue based at least in part on the wait time measurement for the replication queue;
    comparing the adjusted wait time measurement for the first storage queue to the adjusted wait time measurement for the second storage queue; and
    dynamically adjusting priorities of the respective first and second storage queues based at least in part on a result of the comparing.

10. An apparatus comprising:
  at least one processing device comprising a processor coupled to a memory;
  said at least one processing device being configured:
  to process host input-output operations received in a first storage system from at least one host device, the host input-output operations being placed in a first storage queue of the first storage system to await access to one or more backend storage devices of the first storage system;
  to process replication input-output operations in the first storage system for delivery to a second storage system, the replication input-output operations being placed in a second storage queue of the first storage system to await access to the one or more backend storage devices of the first storage system; and
  to dynamically adjust priorities of the respective first and second storage queues for access to the one or more backend storage devices in accordance with one or more priority adjustment criteria;
  wherein dynamically adjusting priorities of the respective first and second storage queues comprises utilizing wait time measurements generated for at least one of a completion queue associated with the host input-output operations and a replication queue associated with the replication input-output operations to determine an adjustment to be made to the priorities of the respective first and second storage queues; and
  wherein dynamically adjusting priorities of the respective first and second storage queues further comprises:
    generating wait time measurements for respective ones of the first and second storage queues;
    generating a wait time measurement for the completion queue;
    generating a wait time measurement for the replication queue;
    adjusting the wait time measurement for the first storage queue based at least in part on the wait time measurement for the completion queue;
    adjusting the wait time measurement for the second storage queue based at least in part on the wait time measurement for the replication queue;
    comparing the adjusted wait time measurement for the first storage queue to the adjusted wait time measurement for the second storage queue; and
    dynamically adjusting priorities of the respective first and second storage queues based at least in part on a result of the comparing.

11. The apparatus of claim 10 wherein said at least one processing device comprises at least a portion of the first storage system.

12. The apparatus of claim 10 wherein dynamically adjusting priorities of the respective first and second storage queues comprises:
  assigning values to respective first and second time slices of a designated processing interval to the first and second storage queues; and
  varying the assigned values of the first and second time slices over time.

13. The apparatus of claim 12 wherein the values assigned to the first and second time slices comprise respective percentages of a time duration of the processing interval.

14. The apparatus of claim 12 wherein the values assigned to the first and second time slices comprise respective numbers of input-output operations associated with the processing interval.

15. The apparatus of claim 10 wherein at least one of the wait time measurements comprises at least one of a simple moving average of a first designated number of previous input-output operations and an exponential moving average of a second designated number of previous input-output operations.

16. The apparatus of claim 10 wherein dynamically adjusting priorities of the respective first and second storage queues based at least in part on a result of the comparing comprises one of:
  responsive to the adjusted wait time measurement for the first storage queue being greater than the adjusted wait time measurement for the second storage queue by more than a first threshold amount, increasing the priority of the first storage queue and decreasing the priority of the second storage queue; and responsive to the adjusted wait time measurement for the second storage queue being greater than the adjusted wait time measurement for the first storage queue by more than a second threshold amount, increasing the priority of the second storage queue and decreasing the priority of the first storage queue.

17. The apparatus of claim 16 wherein increasing the priority of one of the first and second storage queues comprises increasing the priority by a designated delta value.

18. The apparatus of claim 16 wherein the priority of the first storage queue cannot be decreased below a designated minimum value.

19. The apparatus of claim 10 wherein adjusting the wait time measurement for the first storage queue based at least in part on the wait time measurement for the completion queue comprises summing the respective wait time measurements for the first storage queue and the completion queue.

20. The apparatus of claim 10 wherein adjusting the wait time measurement for the second storage queue based at least in part on the wait time measurement for the replication queue comprises summing the respective wait time measurements for the second storage queue and the replication queue.

\* \* \* \* \*